US006653363B1

(12) United States Patent
Tursi, Jr. et al.

(10) Patent No.: US 6,653,363 B1
(45) Date of Patent: Nov. 25, 2003

(54) LOW ENERGY-LOSS, HIGH FIRMNESS, TEMPERATURE SENSITIVE POLYURETHANE FOAMS

(75) Inventors: Daniel V. Tursi, Jr., Media, PA (US); Chiu Y. Chan, Wilmington, DE (US); Beat Niederoest, Marlton, NJ (US)

(73) Assignee: Foamex, L.P., Linwood, PA (US)

( * ) Notice: Subject to any disclaimer, the term of this patent is extended or adjusted under 35 U.S.C. 154(b) by 0 days.

(21) Appl. No.: 10/309,799

(22) Filed: Dec. 4, 2002

(51) Int. Cl.$^7$ ............................................... C08G 18/28
(52) U.S. Cl. ........................ 521/174; 521/126; 521/128; 521/130; 521/137; 521/170
(58) Field of Search ................................ 521/126, 128, 521/130, 137, 170, 174

(56) References Cited

U.S. PATENT DOCUMENTS

| | | |
|---|---|---|
| 4,246,356 A | 1/1981 | Walmsley |
| 4,390,566 A | 6/1983 | Umezawa et al. |
| 4,554,295 A * | 11/1985 | Ridge, Jr. .................... 521/110 |
| 4,722,946 A | 2/1988 | Hostettler |
| 4,839,397 A | 6/1989 | Lohmar et al. |
| 4,980,386 A | 12/1990 | Tiao et al. |
| 5,189,747 A | 3/1993 | Mundy et al. |
| 5,378,733 A | 1/1995 | Bates et al. |
| 5,420,170 A | 5/1995 | Lutter et al. |
| 5,453,455 A | 9/1995 | Krueger et al. |
| 5,545,706 A | 8/1996 | Barksby et al. |
| 5,919,395 A | 7/1999 | Bastin et al. |
| 6,028,122 A | 2/2000 | Everitt et al. |
| 6,051,624 A | 4/2000 | Bastin et al. |
| 6,052,851 A | 4/2000 | Kohnle |
| 6,136,878 A | 10/2000 | Free et al. |
| 6,303,731 B1 | 10/2001 | Carlson et al. |
| 6,316,514 B1 | 11/2001 | Falke et al. |
| 6,337,356 B1 * | 1/2002 | Zaschke et al. .............. 521/174 |
| 6,346,559 B1 | 2/2002 | Thiele et al. |
| 6,372,812 B1 | 4/2002 | Niederoest et al. |
| 2002/0035165 A1 | 3/2002 | Bruchmann et al. |

FOREIGN PATENT DOCUMENTS

WO       WO 93 099 34         5/1993

OTHER PUBLICATIONS

Specialty Composites Corp. CONFOR Foam Data Sheet (1986).
J. H. Saunders & K.C. Frisch, *Polyurethanes*, Part II (1964), pp. 84–87.
*Encyclopedia of Polymer Science*, (John Wiley & Sons, 1988) V. 13, p. 267.
R.D. Duffy, et al., "Viscoelastic Slabstock Foam Fundamentals, Properties and Applications," *Polyurethanes 94* (Oct. 9–12, 1994), pp. 661–663.

* cited by examiner

*Primary Examiner*—John M. Cooney
(74) *Attorney, Agent, or Firm*—Connolly Bove Lodge & Hutz LLP

(57) ABSTRACT

Foaming a polyurethane foam at above atmospheric pressure conditions using a mixture of polyisocyanate and a specific mixture of low molecular weight (high OH number) polyether and graft polyols produces viscoelastic foams with high firmness, low energy losses and high temperature sensitivity such that firmness is reduced by at least 25% when the foam is heated from room temperature (e.g., about 70° F. (21° C.)) to 100° F. (38° C.). The foam-forming ingredients are mixed together and foamed at controlled pressures in the range 1.05 to 1.5 bar (absolute), preferably 1.1 to 1.3 bar (absolute).

13 Claims, 2 Drawing Sheets

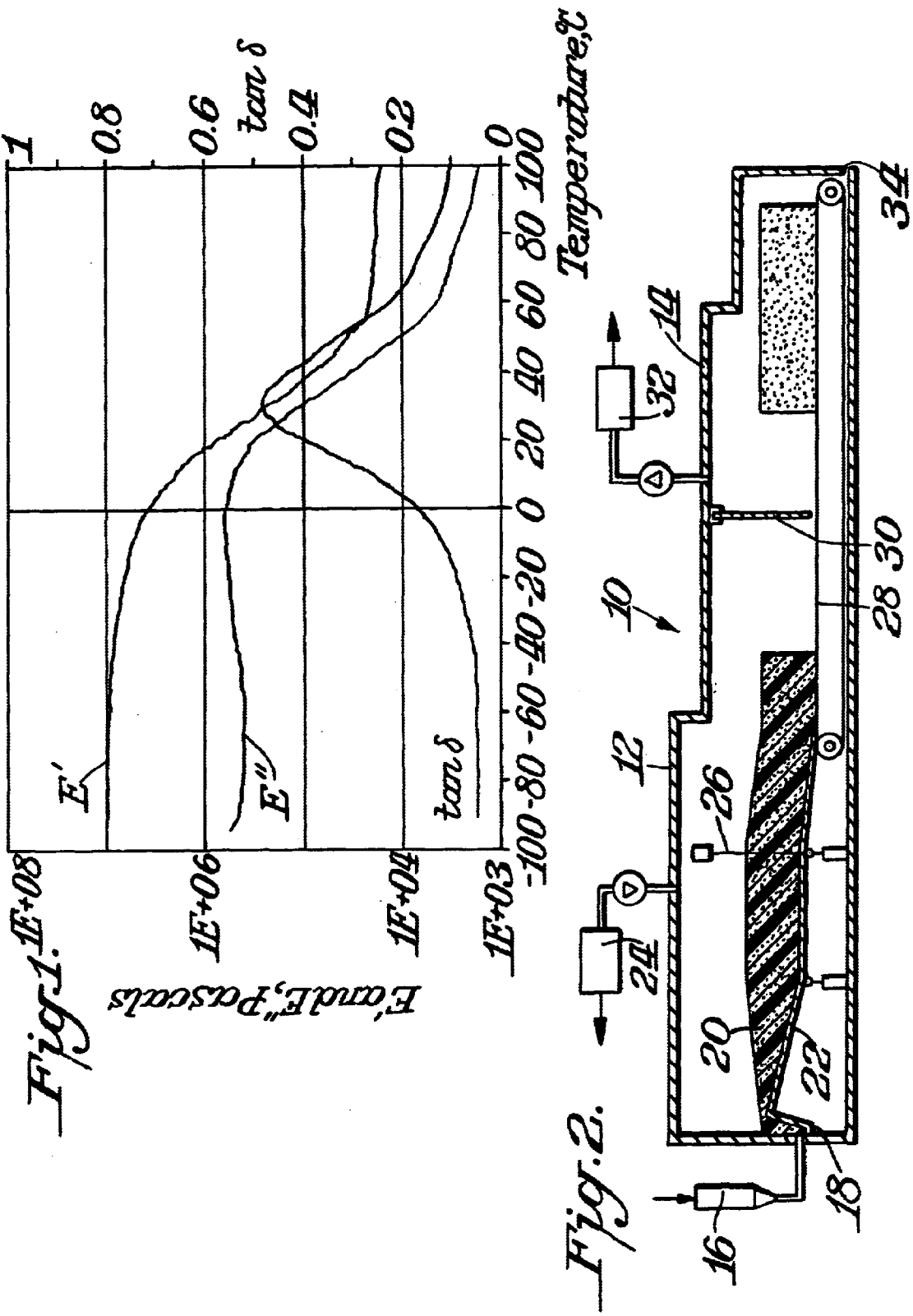

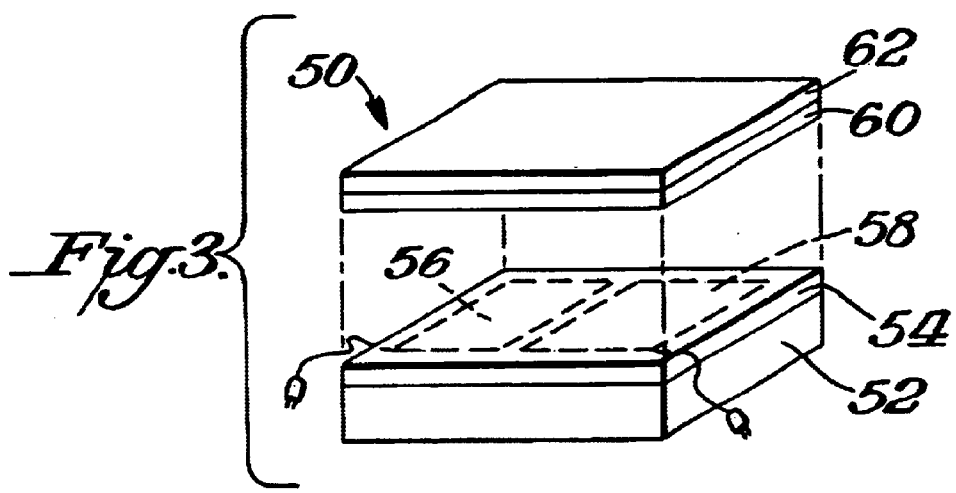
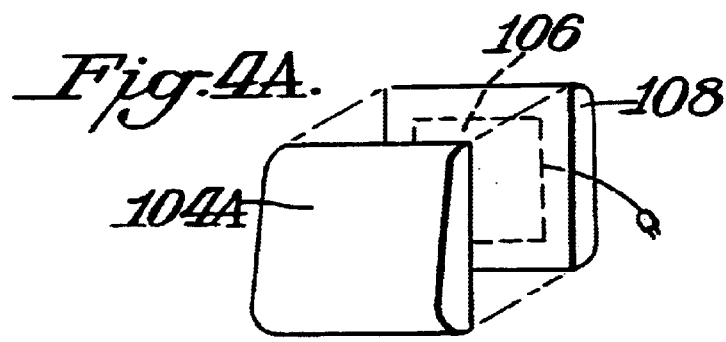
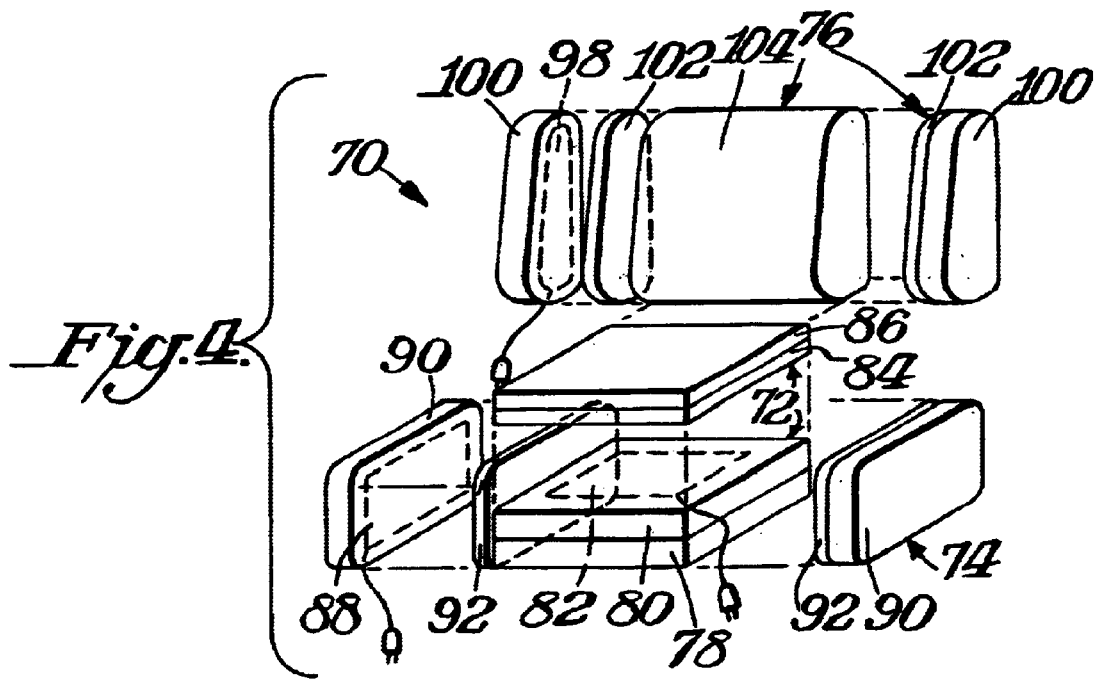

LOW ENERGY-LOSS, HIGH FIRMNESS, TEMPERATURE SENSITIVE POLYURETHANE FOAMS

This invention relates to flexible viscoelastic polyurethane foams used in bedding and furniture cushions. Produced at above atmospheric conditions from certain foaming mixtures, the foams of this invention exhibit a unique combination of low energy losses, high room temperature firmness and high temperature sensitivity.

BACKGROUND OF THE INVENTION

Cellular polyurethane structures typically are prepared by generating a gas during polymerization of a liquid reaction mixture generally comprised of a polyester or polyether polyol, an isocyanate, a surfactant, catalyst and one or more blowing agents. The gas causes foaming of the reaction mixture to form the cellular structure. The surfactant stabilizes the structure.

Once the foam-forming ingredients are mixed together, it is known that the foam may be formed under either elevated or reduced controlled pressure conditions. PCT Published Patent Application WO 93/09934 discloses methods for continuously producing slabs of urethane polymers under controlled pressure conditions. The foam-forming mixture of polyol, isocyanate, blowing agent and other additives is introduced continuously onto a moving conveyor in an enclosure with two sub-chambers. The foaming takes place at controlled pressure. Reaction gases are exhausted from the enclosure as necessary to maintain the desired operating pressure. The two sub-chambers, a saw, and airtight doors are operated in a manner that allows for continuous production of slabstock polyurethane foam.

Polyurethane foams with varying density and hardness or firmness may be formed. Hardness or firmness is typically measured as IFD ("indentation force deflection"). Specifically, $IFD_{25}$ is the force required to compress the foam to 25% of its original thickness or height using the test method set out in ASTM D-3574. Tensile strength, tear strength, compression set, air permeability, fatigue resistance, support factor, and energy absorbing characteristics may also be varied, as can many other properties. Specific foam characteristics depend upon the selection of the starting materials, the foaming process and conditions, and sometimes on the subsequent processing. Among other things, polyurethane foams are widely used for bedding and furniture cushioning applications.

All or almost all polyurethane foams undergo a transition from a rigid glass-like state to a soft rubber-like state. Over that transition, the foam is viscoelastic. Viscoelastic polyurethane foams are typically characterized by high vibration damping, body conformance and slow recovery from compression. Viscoelastic foams generally have high energy losses. While some consumers prefer a conforming, high-energy loss mattress, an equal number prefer a resilient mattress.

Energy losses may be measured with a dynamic mechanical analyzer, which measures the energy storage modulus and the energy loss modulus of a foam sample under compression at a specified frequency over a range of temperatures. One type of dynamic mechanical analyzer is DMTA IV made by Rheometric Science of Piscataway, New Jersey. Two measurements are taken: E' is the storage modulus, which indicates the sample's ability to store energy; E" is the loss modulus, which indicates the sample's ability to dissipate energy. From this data, one can measure the ability of the foam sample to store and dissipate the energy. Because it is difficult to use the absolute values of the storage and loss moduli to analyze the mechanical behavior of a foam sample, frequently the ratio of the loss modulus to the storage modulus (E"/E') is calculated. This ratio is called the tan delta (tan δ). Tan delta is the ratio of the energy lost compared to the energy recovered. The higher the tan delta, the higher is the energy loss. For polyurethane foams, the energy loss typically is in the form of heat. For a perfectly elastic polymer, the tan delta is zero. For typical viscoelastic foams with higher energy losses, the tan delta is about 0.6.

Energy losses also may be measured with a ball rebound test (ASTM D 3574) in which a steel ball is dropped from a fixed height onto a foam sample. The ball is allowed to bounce back from the sample surface, and the height the ball reaches on the first rebound is compared to the original drop height. The percent of height in rebound is reported. A higher number indicates a more resilient material. For typical viscoelastic foams with high energy losses, the ball rebound is below about 8%.

Viscoelastic foams have gained popularity for bedding applications because such foams are advertised as reducing pressure points, which are believed to cause tossing and turning during sleep. For example, TEMPUR-PEDIC mattresses and pillows from Tempur-pedic, Inc. of Lexington, Kentucky, are formed of a viscoelastic foam. While many end-users enjoy the body conformance offered by viscoelastic (slow-recovery) foam mattresses, others have complained about having to "struggle to climb out of bed," which translates to the high energy losses exhibited by viscoelastic foams.

Another unique feature of viscoelastic foams is a strong temperature sensitivity, whereby the foam firmness varies with temperature. For most typical slabstock polyurethane foams, the viscoelastic transition occurs at about −50° C., which is termed the glass transition temperature of the foam. Hence, at room temperatures of 20 to 25° C., such foams do not have viscoelastic properties and cannot be used for room temperature viscoelastic applications. Some commercially available viscoelastic foams have glass transition temperatures just below about +5° C., which still prohibits their use for room temperature viscoelastic applications.

U.S. Pat. No. 5,669,094 (Swanson) discloses a mattress construction having a viscoelastic open celled polyurethane foam as a top layer. The viscoelastic foam is stated to have temperature sensitivity such that its hardness changes between 4° C. and 10° C. A preferred viscoelastic foam was CONFOR CF-40, which had $IFD_{25}$ values of 35 lbf at 10° C., 4 lbf at 21° C. and 3 lbf at 38° C. U.S. Pat. No. 6,052,851 (Kohnle) similarly suggests using a CONFOR CF-40 or CF-42 viscoelastic foam as a conforming layer in a mattress construction. Such foams are excessively soft at room temperatures, and do not exhibit significant temperature sensitivity over a temperature range from 70° F. to 110° F. (21° C. to 43° C.). Moreover, these patents do not disclose methods for making viscoelastic foams with room temperature sensitivity and high $IFD_{25}$ at room temperature without significant foam energy losses. See also U.S. Pat. Nos. 6,256,821 (Boyd) and 5,960,496 (Boyd).

U.S. Pat. No. 5,855,415 (Lilley, Jr.) describes a portable seat cushion having an upper foam layer with an impact resilience of 15% or less and with temperature-sensitive compression stiffness response in the temperature range of 10° C. to 40° C. The foam has an IFD between 10 and 25 and a density of from 24 kg/m³ to 40 kg/m³ (1.5 to 2.5 pcf). The patent does not disclose any method for making such foam.

Given that some consumers may prefer a firm mattress, where others prefer a softer mattress, it would be advantageous if the consumer were able to adjust the firmness of the mattress after purchase by some controllable means, such as varying the temperature. Desirably, a foam for a mattress construction should have an $IFD_{25}$ range of about 20 to 55 lb within a temperature range of about 70° F. to 110° F. The prior art does not show mattress and cushion constructions including polyurethane foams that have high firmness at room temperature (about 68° F. to 77° F. (20° C. to 25° C.)), coupled with strong temperature sensitivity over this range a low energy losses.

High firmness, low energy loss polyurethane foams with strong temperature sensitivity at or near room temperature are continually sought for bedding and furniture applications. The prior art does not disclose such foams or methods for making them.

SUMMARY OF THE INVENTION

According to the invention, flexible, high firmness, temperature sensitive viscoelastic polyurethane foams with low energy losses are produced using a method comprising preparing a foam reaction mixture and foaming that mixture at above atmospheric pressure conditions, preferably at pressures in the range of 1.05 to 1.5 bar (absolute), most preferably 1.1 to 1.3 bar (absolute). The reaction mixture contains: (a) a polyol mixture of (i) about 30 to 95 percent by weight total polyols of a polyether polyol having a hydroxyl number in the range of about 120 to 280 and a functionality from 2.7 to 3.3, and (ii) about 5 to 70 percent by weight total polyols of a graft polyol having a hydroxyl number in the range of about 25 to 50 and a functionality from 2.5 to 3.0; (b) an organic polyisocyanate selected from the group consisting of toluene diisocyanate and toluene diisocyanate mixed with methylene diisocyanate, wherein if a mixture of toluene diisocyanate and methylene diisocyanate is used, the polyisocyanate mixture comprises from about 5 to 20 percent by weight toluene diisocyanate and about 80 to 95 percent by weight methylene diisocyanate, wherein at least 50 percent of the methylene diisocyanate is 4, 4' methylene diisocyanate, and wherein the isocyanate index is at or below 120, and preferably in the range of 80 to 120, most preferably 80 to 95; and (c) from about 1.5 to 3.0 parts per hundred parts polyol of water as a blowing agent.

Most preferably, the foam-forming composition contains up to 2 parts per hundred parts polyol of an amine catalyst, up to 2 parts per hundred parts polyol of a surfactant, up to 0.5 parts per hundred parts polyol of an organotin catalyst, and up to 2 parts per hundred parts polyol of a cross linking agent.

The resulting viscoelastic polyurethane foams have densities in the range of about 1.5 to 4 pounds per cubic foot, preferably about 2 to 3.5 pounds per cubic foot, and an $IFD_{25}$ of about 20 to 60 lb at 72° F. (22° C.) and an $IFD_{25}$ of about 15 to 35 lb at 100° F. (38° C.). The foams have a temperature sensitivity such that when the foam is heated from room temperature to about 100° F. (38° C.), the $IFD_{25}$ is reduced by 25% or more from the room temperature $IFD_{25}$ value. The foams further have a ball rebound of at least 9%.

The viscoelastic foams according to the invention may be incorporated into mattresses or mattress pads, seat cushions, automotive seating, cushions or components. When so incorporated, the foam or a portion of such foam may be heated to reduce the firmness, preferably (as measured by $IFD_{25}$) by at least 25% from its room temperature firmness.

DESCRIPTION OF THE FIGURES

FIG. 1 is a graph of the foam modulus versus temperature generated by a dynamic mechanical analyzer for the foam of Example A;

FIG. 2 is a schematic drawing of an apparatus that may be used to form foams under controlled pressures above atmospheric pressure;

FIG. 3 is an exploded perspective view of a mattress construction incorporating the temperature sensitive viscoelastic foam of the invention;

FIG. 4 is an exploded perspective view of automobile seating incorporating the temperature sensitive viscoelastic foam of the invention; and FIG. 4A is an exploded perspective view of an automobile back seat cushion incorporating the temperature sensitive viscoelastic foam of the invention.

DESCRIPTION OF THE PREFERRED EMBODIMENT

Polyether polyols used to prepare flexible polyurethane foams typically have molecular weights between 500 and 7000. One example of these conventional polyols is VORANOL® 3010 from Dow Chemical, which has a hydroxyl ("OH") number of 56 mg KOH/g and a functionality of 2.9, with an EO content of 8.5%. To make a viscoelastic foam, it is often desirable to use a so-called "viscoelastic polyol". The viscoelastic polyols are characterized by high OH numbers of above 90 and tend to produce a shorter-chain polyurethane blocks with a glass transition temperature closer to room temperature. Examples of the higher-OH polyols are U-1000 from Bayer (OH number 168) and G30–240 from Huntsman (OH number 240), both of which contain no EO.

The term "polyether polyol" includes linear and branched polyethers (having ether linkages) and containing at least two hydroxyl groups, and includes polyoxypropylene polyether polyol or mixed poly (oxyethylene/oxypropylene) polyether polyol. Preferred polyethers are the polyoxyalkylene polyols, particularly the linear and branched poly (oxyethylene) glycols, poly (oxypropylene) glycols and their copolymers. Graft or modified polyether polyols are those polyether polyols having a polymer of ethylenically unsaturated monomers dispersed therein. Representative modified polyether polyols include polyoxypropylene polyether polyol into which is dispersed poly (styrene acrylonitrile) or polyurea, and poly (oxyethylene/oxypropylene) polyether polyols into which is dispersed poly (styrene acrylonitrile) or polyurea. Graft or modified polyether polyols contain dispersed polymeric solids. The solids increase hardness and mechanical strength of the resultant foam. Especially preferred graft polyols in this invention are ARCOL HS-100 from Bayer AG or Dow VORANOL 3943.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl groups per molecule.

A preferred polyol combination for the invention has from 30 to 95% by weight conventional polyether polyol and 5 to 70% by weight graft polyol. The preferred polyether polyol has a functionality from 2.7 to 3.3 and hydroxyl number from 180 to 280. The polyether polyol should contain from 0 to 40% EO. The preferred graft polyol has a functionality from 2.5 to 3.0 and an hydroxyl number from 25 to 50. It should contain styrene and acrylonitrile in a ratio of about 70 to 30.

The amount of isocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range from 70 to 140. In this invention, the isocyanate index is from 80 to 120, and preferably the isocyanate index is in the range of 80 to 95.

Conventional polyisocyanates may be used in this invention. The preferred polyisocyanates are toluene diisocyanate (TDI), methylene diisocyanate (MDI), and a mixture of both. A well known toluene diisocyanate is TD80, a commercially available blend of 80 percent of 2, 4 toluene diisocyanate and 20 percent of 2, 6 toluene diisocyanate. A well known methylene diisocyanate is Suprasec-7050 from Huntsman/ICI, which has a NCO content of 32.8 percent with over 50 percent 4, 4'-methylene diisocyanate. Polyisocyanates are typically used at a level of between 20 and 90 parts by weight per 100 parts of polyol, depending upon the polyol OH content and the water content of the formulation.

Catalysts are used to control the relative rates of water-isocyanate (gas-forming) and polyol-isocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-isocyanate reaction, whereas the organotin catalysts are known to have a greater effect on the polyol-isocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used in the present invention, control of the gelling catalyst level is critical to producing foams with desired air permeability, which is a factor known to significantly affect foam cushioning performance. We have found that the following ranges of catalyst amounts are satisfactory: amine catalyst from 0 to 2 parts per 100 parts polyol; and organotin catalyst from 0 to 0.5 parts per 100 parts polyol.

One or more surfactants are also employed in the foam-forming composition. The surfactants lower the bulk surface tension, promote nucleation of bubbles, stabilize the rising cellular structure and emulsify incompatible ingredients. The surfactants typically used in polyurethane foam applications are polysiloxane-polyoxyalkylene copolymers, which are generally used at levels between about 0.5 and 3 parts by weight per 100 parts polyol. In the present invention from 0 to 2 parts by weight per 100 parts polyol of surfactant is preferred, and 0.5 parts by weight per 100 parts polyol is most preferred.

A blowing agent may be included in the foam-forming composition. The most typical blowing agent is water that may be added in amounts from 1 to 2.5 parts per hundred parts polyol. Preferably, water as blowing agent is added in an amount suitable to achieve a desired foam density, and the amount may vary depending upon the operating pressure in the foaming chamber. We have found that at pressures in the range of 1.05 to 1.5 bar, from 1.5 to 3.0 parts per hundred parts polyol is an appropriate amount of water to achieve a foam with a higher density of about 1.5 to 4.0 pounds per cubic feet.

Cross-linking agents may be included in the foam-forming composition to enhance processing and foam stability. Typically, cross-linking agents are relatively small molecules containing 2 or 3 active hydrogen groups, and are added in amounts from 0 to 2 parts per hundred parts polyol. Representative cross-linking agents that may be included in the reaction mixture of the invention are diethanolamine (DEOA), ethylene glycol (EG), diethylene glycol (DEG), propylene glycol (PG), dipropylene glycol (DPG), 1, 4-butanediol (BDO), commercially available Bayer AF DP1022 and R2580. Most preferably, the cross-linking agents are included in amounts from 0 to 0.5 parts per hundred parts polyol.

Optionally, other additives may be incorporated into the foam-forming composition. The optional additives include, but are not limited to, fire retardants, stabilizers, antimicrobial compounds, extender oils, dyes, pigments, and antistatic agents. Such additives should not have a detrimental effect on the properties of the final polyurethane foam.

The foam-forming process may be carried out batch-wise, semi-continuously or continuously, as long as the pressure may be controlled and maintained above atmospheric pressure, preferably in the range of about 1.05 to 1.5 bar (absolute), most preferably 1.1 to 1.3 bar (absolute). The foams produced with the stated reaction mixtures at these elevated pressures have densities in the range of 1.5 to 4 pounds per cubic foot (lbs/ft$^3$ or pcf), preferably 2 to 3.5 pcf.

FIG. 2 shows in schematic an apparatus that might be used to form the inventive foams in a continuous process. The figure is taken from the disclosure in WO93/09934. In such an apparatus 10, there is a process subchamber 12 and an adjacent airlock subchamber 14. The subchambers 12, 14 are separated from one another by door 30. Foam-forming ingredients are introduced to mix head 16 and mixed for a suitable time. Once mixed together, the foam-forming ingredients form a frothing liquid that is introduced to the bottom of trough 18 and flows upwardly and onto the fall plates 22. The foam rises as it is conveyed away from the trough. After the foam has completely risen, a foam slab 25 is then cut from the foamed material using cut off blade 26. The slab is conveyed by the moving conveyor 28. Fan 24 exhausts process gases to maintain the pressure within the process enclosure 12. The first door 30 opens to allow the slab 25 into the airlock enclosure 14. The door 30 closes and the pressure inside the airlocked chamber is returned to atmospheric conditions. A second exhaust fan 32 removes additional process gases. The foam slab 25 exits the airlock chamber 14 through door 24. The airlock chamber 14 is returned to operating pressure and the process continues. The viscoelastic foams according to the invention may be incorporated into different products where temperature sensitivity can be used to vary the firmness.

Referring next to FIG. 3, a mattress construction 50 has a mattress foundation 52 over which is positioned a layer 54 of temperature sensitive viscoelastic foam according to the invention. A first heating pad 56 and a second heating pad 58 are disposed over the viscoelastic foam layer 54. Each heating pad 56, 58 preferably is separately electrically actuable. As one example, cords with plugs for fitting into electric outlet sockets are shown extending from each pad in FIG. 3. A second layer 60 of viscoelastic foam according to the invention is placed over the first and second heating pads 56 and 58. The first and second heating pads 56, 58 thus nest between the first and second viscoelastic foam layers 54, 60. Preferably, a quilted panel 62 or other mattress top layer construction covers the second viscoelastic foam layer 60.

The mattress construction 50 in FIG. 3 allows a consumer to selectively adjust the firmness of the mattress. As one example, the second viscoelastic foam layer 60 may be provided with an $IFD_{25}$ at room temperature in the range of 35 to 45 lbf. Upon activating the first heating pad 56, the firmness of the viscoelastic foam in contact with the heating pad changes, becoming softer. For example, if the first heating pad heats the foam in contact to 100° F., the $IFD_{25}$ at this elevated temperature reduces to 20 to 30 lbf, or preferably at least 25% less than the room temperature $IFD_{25}$. If the second heating pad 58 has not been activated, then the foam layer portion that is in contact with the second heating pad 58 remains at or near its room temperature firmness. In this manner, one side of the mattress 50 has been adjusted to a different firmness than the other side. Alternatively, the first and second heating pads 56, 58 may be activated to reach different temperatures above room temperature to variably adjust the mattress firmness by varying the $IFD_{25}$ of the foam in contact with the heating pads to different values.

FIG. 4 shows the components of an automotive seat 70 having a bottom seat section 72, side seat sections 74, back and lumbar support section 76. The bottom seat section 72 has a lower layer of supporting foam 78 over which is provided a layer 80 of viscoelastic foam according to the invention. A heating pad 82 is disposed over the viscoelastic foam layer 80. The heating pad 82 is covered with a second layer 84 of viscoelastic foam according to the invention. A top foam layer 86 preferably then covers the second viscoelastic foam layer 84. The bottom seat section 72 thus is formed as a composite of the foam layers 78, 80, 84, 86 and heating pad 82.

Each side seat section 74 has a heating pad 88 disposed between first and second layers 90, 92 of viscoelastic foam according to the invention. Each side lumbar section 76 has a heating pad 98 disposed between first and second layers 100, 102 of viscoelastic foam according to the invention. A back cushion 104 formed of a solid cut or molded foam piece is shown in FIG. 4. Alternatively, as shown in FIG. 4A, the back cushion may be provided with a heating pad 106 disposed between a top layer 104A of viscoelastic foam according to the invention and a back layer 108 of foam that can be viscoelastic foam according to the invention. The automotive seat components are usually encased within upholstery fabric or leather or a combination thereof to form the automotive seating.

The automotive seat construction in FIG. 4 allows a consumer to selectively adjust the firmness of the seat components. As one example, the viscoelastic foam layers 80, 84, 90, 92, 100, 102 and 104A may be provided with a room temperature $IFD_{25}$ firmness in the range of 30 to 50 lbf. When one or more of the heating pads 82, 88, 98 or 106 is activated to heat the viscoelastic foam in contact therewith, the foam softens to a lesser firmness. For example, cords with plugs for mating into electric outlets are shown in FIGS. 4 and 4A; however, it should be understood that the electric connections may be hard-wired into a power source (not shown) and actuated and controlled by the seated passenger via a control panel or via switches (not shown) disposed on or adjacent to a portion of the automotive seating. Optionally, insulating layers (not shown) may be provided in the seat construction to separate the heated viscoelastic foams from the consumer sitting on the automotive seat.

The invention is further illustrated, but not limited by, the following examples.

EXAMPLES

The foam samples in Examples A to H were prepared batch-wise on a laboratory scale in a fixed head foam machine with the formulations listed in Table 1. The water, isocyanate, polyols, surfactants, catalysts and other additives were poured from the fixed mixing head into a box positioned inside a chamber under pressure. The pressure was maintained above atmospheric pressure by pumping air into the chamber. Using a pressure regulator, the pressure was maintained at the operating pressure while the foam was allowed to rise. In the case of foams made at 1 bar (1000 mbar) pressure, the boxes were located outside the chamber as pressure control was not necessary.

$CFD_{25}$ or "compression force deflection" was determined for each foam sample in accord with the procedure of ASTM D3574. The foam was compressed by 25% of its original height and the force was reported after one minute. The foam samples were cut to a size 2"×2"×1" prior to testing. The $CFD_{25}$ values were then translated to $IFD_{25}$ or "indentation force deflection" values using an established correlation equation.

After room temperature (72° F./22° C.) $IFD_{25}$ measurements were completed, the foam samples were placed into an oven to heat the samples to 100° F. (38° C.). An infra-red temperature probe was used to measure the sample temperature. $IFD_{25}$ values were then determined for the heated samples.

Tear strength (pli), tensile strength (psi), and ball rebound (%) also were measured according to the procedures set forth in ASTM D3574. Air permeability was determined in cubic feet per square foot per minute for each sample using a Frazier Differential Pressure Air Permeability Pressure Machine in accord with ASTM 737.

E' and E" moduli measurements were determined with a dynamic mechanical analyzer (a DMTA IV from Rheometric Science) for foam samples over a range of temperatures. The tan delta was calculated for each sample at 72° F. (22° C.) and 100° F. (38° C.). The maximum tan delta over the temperature range from 72° F. (22° C.) to 100° F. (38° C.) was also calculated and reported in Table 1.

FIG. 1 shows a graph of the storage modulus (E'), loss modulus (E") and tan delta (tan δ) as a function of sample temperature for the foam of Example A (according to the invention). The maximum tan δ over the temperature range from 72° F. (22° C.) to 100° F. (38° C.) was 0.48, demonstrating that this foam had a lower energy loss than exhibited by the comparison foams of Examples J and K, which had maximum tan delta values above 1.1.

The glass transition temperature (Tg) of each foam sample was determined from the dynamic mechanical analysis. The Tg for a given sample is the temperature where the tan delta curve is at its maximum.

TABLE 1

| | | A | B | C | D | E | F | G | H | I<br>3pcf Visco | J<br>Tempur-pedic | K<br>Confor CF-47 | L<br>Confor C-42 |
|---|---|---|---|---|---|---|---|---|---|---|---|---|---|
| Polyol | G30-240 | 50 | 75 | 60 | 35 | 50 | 50 | 50 | 50 | 0 | | | |
| Polyol | G30-167 | 0 | 0 | 0 | 0 | 0 | 0 | 0 | 0 | 75 | | | |
| Polyol | HS-100 | 50 | 25 | 40 | 65 | 50 | 50 | 50 | 50 | 25 | | | |
| Surfactant | L-618 | 0.5 | 0.5 | 0.5 | 0.5 | 0.5 | 0.5 | 0.5 | 0.5 | 0.5 | | | |
| Amine | ZF123 | 0.25 | 0.25 | 0.25 | 0.25 | 0.14 | 0.14 | 0.14 | 0.25 | 0.3 | | | |
| Tin Catalyst | T-9 | 0.03 | 0.03 | 0.03 | 0.09 | 0.04 | 0.03 | 0.02 | 0.03 | 0.03 | | | |
| Blowing Agent | Water | 2.3 | 2.3 | 2.3 | 2.3 | 2.2 | 2.4 | 2.7 | 1.92 | 2.2 | | | |
| Isocyanate | TD80 | 38.8 | 46.2 | 41.7 | 34.3 | 35.8 | 39.6 | 5.4 | 35.2 | 35.5 | | | |
| Isocyanate | MDI Suprasec 7050 | — | — | — | — | — | — | 48.1 | — | — | | | |
| | Index | 90 | 90 | 90 | 90 | 85 | 90 | 80 | 90 | 85 | | | |
| | Chamber Pressure (mbar) | 1250 | 1250 | 1250 | 1250 | 1250 | 1100 | 1100 | 1000 | 1000 | | | |
| | Density (pcf) | 3 | 3 | 3 | 3 | 3 | 2.5 | 3 | 3 | 3 | 5.8 | 5.8 | 5.7 |
| | Tg, °F. | 30 | 48 | 41 | 38 | 29 | | 60 | 28 | 6.4 | 19 | 36 | 27 |
| | IFD$_{25}$ @ 72° F. (lb) | 43 | 24 | 34 | 57 | 34 | 35 | 47 | 25 | 10 | 18 | 43 | 26 |
| | IFD$_{25}$ @ 100° F. (lb) | 25 | 11 | 19 | 36 | 25 | 23 | 26 | 20 | 8 | 15 | 24 | 22 |
| | % Change in IFD$_{25}$ | -42 | -54 | -44 | -37 | -26 | -34 | -45 | -20 | -20 | -17 | -44 | -15 |
| | ½" perm. (cfm/ft$^2$) | 107 | 35 | 100 | 110 | 100 | 210 | 10 | 153 | 99 | 8 | 0 | 0 |
| | Tan delta @ 72° F. | 0.43 | 0.19 | 0.33 | 0.32 | 0.46 | | 0.25 | 0.53 | 0.35 | 1.37 | 0.35 | 1.04 |
| | Tan delta @ 100° F. | 0.45 | 0.54 | 0.52 | 0.34 | 0.40 | | 0.34 | 0.49 | 0.27 | 0.56 | 1.10 | 0.65 |
| | Max Tan delta from 72 to 100° F. | 0.48 | 0.54 | 0.52 | 0.35 | 0.47 | | 0.34 | 0.57 | 0.35 | 1.37 | 1.12 | 1.17 |
| | Ball Rebound @ 72° F. (%) | 9 | 14 | 9 | 11 | 9 | 11 | 11 | — | 15 | 2 | 3 | 1 |
| | Ball Rebound @ 100° F. (%) | 12 | 11 | 11 | 15 | 15 | 12 | 14 | — | 22 | 6 | 5 | — |
| | Tensile Strength (psi) | 35 | | | | 29 | 36 | | | | | 25.2 | 18.1 |
| | Tear Strength (lb/in) | 3.1 | | | | 2.6 | 2.9 | | | | | 5.5 | 3.4 |

The polyols were obtained from the following suppliers: ARCOL® HS100 from Bayer AG; G30–167 and G30–240 from Huntsman. Surfactant L-618 was obtained from Crompton. The amine catalyst ZF123 and the tin catalyst T-9 were from Huntsman. As for isocyanates, MDI Suprasec 7050 was from Huntsman, and TD80 was from Dow Chemical.

Referring to the data obtained in Table 1, we found that Example A according to the invention had a high IFD$_{25}$ (43 lb) and a high temperature sensitivity-42% loss of IFD$_{25}$ when the temperature was varied from 72° F. to 100° F. Also, Example A had a relatively low energy loss as indicated by the maximum tan delta of 0.48 over the temperature range of 72° to 100° F. and ball rebound of 9%.

In comparison, Example I, a conventional 3 pcf density viscoelastic foam made with a high molecular weight (lower OH number) polyol had essentially no temperature sensitivity at or near room temperature. A commercially available sample of Tempur-pedic (Example J) was found to have poor temperature sensitivity (IFD$_{25}$ did not change significantly) and high energy losses around room temperature (tan delta was 1.37). While other commercially available samples Confor CF 47 (Example K) and Confor CF 42 (Example L) had temperature sensitivity (IFD$_{25}$ changed when temperature raised), but their energy losses also were extremely high, as indicated by the high tan delta values (1.12 and 1.17, respectively) and extremely low ball rebound values (2.8% for Example J and 1% for Example K). In addition, the Confor CF-42 foam (Example L) did not show significant enough temperature sensitivity (25% or greater change in IFD$_{25}$)—the reduction in IFD$_{25}$ was-15% at 100° F.

In Examples B thru F according to the invention, the polyol composition, isocyanate index and foaming pressure were adjusted to vary the temperature sensitivity. As shown in Example B, a higher G30–240 polyol level produced a foam with a higher temperature sensitivity, but also with lower IFD$_{25}$ and air permeability. In Example E, the lower isocyanate index was shown to give a lower temperature sensitivity. Specifically, the drop in the IFD$_{25}$ was 26% rather than over 30% or over 40% as experienced with other samples. Example F was foamed at a lower chamber pressure and resulted in a lower density foam that still retained a relatively high temperature sensitivity and low energy loss.

Example G according to the invention showed that using a MDI/TDI isocyanate mixture, a higher density, high firmness but low energy loss foam could be made.

We found that the combination of certain foaming ingredients, particularly the use of a high-OH number polyether polyol or combination of polyols including such high-OH number polyol, with above-atmospheric pressure foaming, as in Example A, produces a high density viscoelastic foam with high firmness at room temperature, high temperature sensitivity and low energy losses.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A method for producing a viscoelastic polyurethane foam, comprising:

(1) preparing a reaction mixture comprising:
        (a) a polyol mixture of (i) about 30 to 95 percent by weight total polyols of a polyether polyol, and having a hydroxyl number in the range of about 180 to 280 and a functionality from 2.7 to 3.3, and (ii) about 5 to 70 percent by weight total polyols of a graft polyol having a hydroxyl number in the range of about 25 to 50 and a functionality from 2.5 to 3.0;
        (b) an organic polyisocyanate selected from the group consisting of toluene diisocyanate and methylene diisocyanate mixed with toluene diisocyanate, wherein at least 50 percent of the methylene diisocyanate is 4, 4' methylene diisocyanate, wherein if a mixture of methylene diisocyanate and toluene diisocyanate is used, the polyisocyanate mixture comprises from about 5 to 20 percent by weight toluene diisocyanate and about 80 to 95 percent by weight methylene diisocyanate, and wherein the isocyanate index is below about 120; and
        (c) from about 1.5 to 3.0 parts per hundred parts polyol of water as a blowing agent; and (2) allowing said reaction mixture to react while held at a pressure of about 1.05 to 1.5 bar (absolute) so as to form the viscoelastic polyurethane foam, wherein the viscoelastic polyurethane foam at room temperature has a density of at least 2.0 pounds per cubic foot, a ball rebound of at least 9%, and an $IFD_{25}$ in the range of about 20 to 60 lbf, and wherein the viscoelastic foam has a temperature sensitivity such that when the foam is heated from room temperature to about 100° F. (38° C.) the $IFD_{25}$ is reduced by 25% or more from the room temperature $IFD_{25}$ value.

2. The method of claim 1, wherein the resulting polyurethane foam has a density in the range of about 2 to 3.5 pounds per cubic foot.

3. The method of claim 1, wherein the reaction mixture contains up to two parts by weight per hundred parts polyol of a cross linking agent.

4. The method of claim 1, wherein the reaction mixture contains up to two parts by weight per hundred parts polyol of a surfactant.

5. The method of claim 1, wherein the reaction mixture contains up to two parts by weight per hundred parts polyol of a catalyst.

6. The method of claim 1, wherein the reaction mixture contains up to two parts by weight per hundred parts polyol of an amine catalyst.

7. The method of claim 1, wherein the reaction mixture contains up to 0.5 parts by weight per hundred parts polyol of a tin catalyst.

8. The method of claim 1, wherein the pressure is from 1.1 to 1.3 bar (absolute).

9. The method of claim 1, wherein at 100° F. (38° C.) the $IFD_{25}$ of the foam is in the range of from 15 to 35 lbf.

10. The method of claim 1, wherein the viscoelastic foam has a tan delta less than 0.6 over the temperature range from room temperature to 100° F. (38° C.).

11. A viscoelastic polyurethane foam produced according to the method of claim 1.

12. A mattress or mattress cushion comprising at least in part a viscoelastic foam produced according to the method of claim 1.

13. A seat cushion comprising at least in part a viscoelastic foam produced according to the method of claim 1.

* * * * *